H. HASSELKNIPPE.
MOTOR SLED.
APPLICATION FILED APR. 4, 1917.
1,291,500.
Patented Jan. 14, 1919.
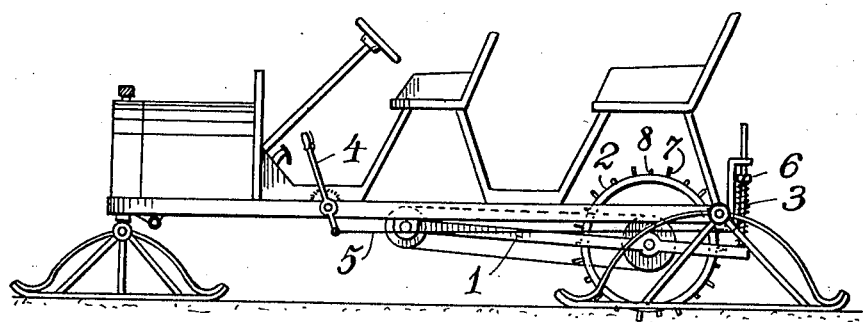
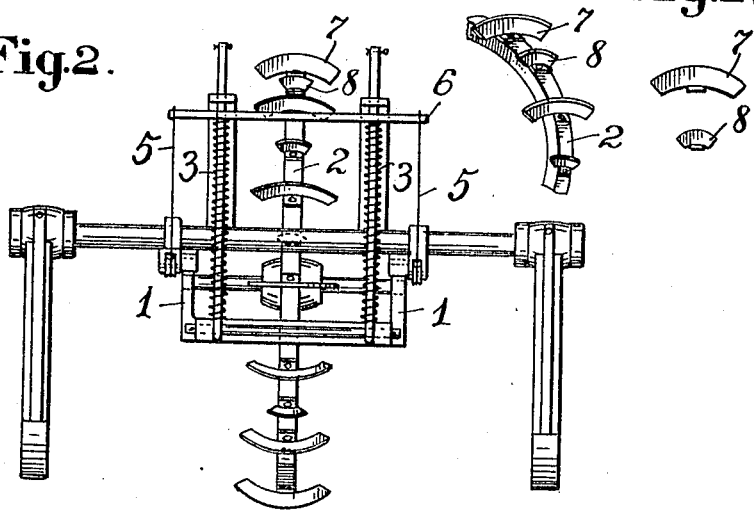
Lars Hasselknippe
Inventor
by (signature)
Attorney

UNITED STATES PATENT OFFICE.

LARS HASSELKNIPPE, OF GJOVIK, NORWAY.

MOTOR-SLED.

1,291,500.  Specification of Letters Patent.  Patented Jan. 14, 1919.

Application filed April 4, 1917. Serial No. 159,823.

*To all whom it may concern:*

Be it known that I, LARS HASSELKNIPPE, a subject of the King of Norway, residing at Gjovik, in the Kingdom of Norway, have invented certain new and useful Improvements in Motor-Sleds, and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a motor sled of the type comprising a toothed or shoveled driving wheel mounted at the free end of a lever, which is pressed against the ground by means of springs or the like.

According to the present invention the pressure of the springs pressing said lever with the driving wheel against the ground may be regulated from the driver's seat by means of ropes or wires fastened to a pivoted lever, and further the invention comprises a particular form of the driving wheel shovels or buckets by which is obtained the advantage that the same have a large active surface in loose snow and in the whole on loose ground, while on hard ground they are still able to get a sufficient grip on the surface.

On the drawings:

Figure 1 shows a form of the invention in side view.

Fig. 2 illustrates the sled as seen from behind on a larger scale.

Fig. 3 shows parts of the driving wheel.

Fig. 4 is a view of two of the driving shovels.

As seen on Figs. 1 and 2 the lever 1 carrying the driving wheel 2 is acted upon at its free end by the springs in a downwardly direction thus pressing the wheel with its shovels against the ground.

The pressure of the said springs 3 may be controlled from the driver's seat by means of a lever 4, which is connected by means of wires 5 with both ends of a cross piece 6 forming the upper support for the springs 3.

By pulling back the handle of the lever 4 the cross piece 6 is pulled downward by means of the wires 5, the springs 3 are compressed, and the shovels on the wheel 2 are pressed hard into the snow.

In order to provide a large acting surface of the shovels in soft snow and at the same time make them effective on hard ground, the shovels as seen in Figs. 2–4 are given the form of ring- or disk- sectors 7 with comparative large breadth. Between each pair of broad shovels is mounted a narrow shovel which is intended particularly for hard ground.

I claim:

1. In a motor sled, a pivoted lever carrying the driving wheel and extending rearwardly beyond said wheel, springs acting on the rearward extremity of said lever to press the wheel in a downward direction and a hand lever for controlling the pressure of said springs from the driver's seat.

2. In a motor sled, a pivoted lever carrying the driving wheel and extending rearwardly beyond said wheel, springs acting between the rearward extremity of said lever and a vertically slidable support, to press the wheel in a downward direction, a hand lever for controlling the pressure of said springs from the driver's seat, and wires connecting said lever with the vertically slidable support, for controlling the pressure of the springs.

In testimony that I claim the foregoing as my invention, I have signed my name in presence of two subscribing witnesses.

LARS HASSELKNIPPE.

Witnesses:
C. NORMAN,
KARL L. LEE.

Copies of this patent may be obtained for five cents each, by addressing the "Commissioner of Patents, Washington, D. C."